United States Patent [19]

Hong

[11] Patent Number: 6,103,783
[45] Date of Patent: Aug. 15, 2000

[54] ELASTIC WATER-PERMEABLE CONCRETE COMPOSITION, FORMULATION METHOD THEREFOR, ELASTIC WATER-PERMEABLE CONCRETE STRUCTURE FORMED OF THE COMPOSITION, AND METHOD FOR CONSTRUCTING THE STRUCTURE

[76] Inventor: Young-keun Hong, 1-1508 Sunkyung Apt., 506 Daechi-dong, Kangnam-gu, Seoul, Rep. of Korea

[21] Appl. No.: 09/140,605

[22] Filed: Aug. 26, 1998

[30] Foreign Application Priority Data

Feb. 7, 1998 [KR] Rep. of Korea ........................ 98-3570

[51] Int. Cl.$^7$ ................................ C08K 9/00; B05D 7/00
[52] U.S. Cl. ........................ 523/206; 523/205; 427/136; 427/137; 427/138; 427/212; 427/220; 427/221; 427/393.6; 427/402; 427/407.1
[58] Field of Search .................................... 523/205, 206, 523/221; 427/136, 137, 138, 212, 220, 221, 393.6, 402, 407.1

[56] References Cited

U.S. PATENT DOCUMENTS 5,182,137  1/1993  Allen ....................................... 427/138

FOREIGN PATENT DOCUMENTS 618969   4/1961   Canada ................... 523/206
732314   5/1980   U.S.S.R. ................. 523/205
883087  11/1981   U.S.S.R. ................. 523/205

OTHER PUBLICATIONS

Grant & Hackh's Chemical Dictionary, 1991, Fifth Edition, McGraw Hill, p. 149.

*Primary Examiner*—Peter A. Szekely
*Attorney, Agent, or Firm*—Dvorak & Orum

[57] ABSTRACT

An elastic water-permeable polymeric concrete composition, a formulation method therefor, an elastic water-permeable polymeric concrete structure using the composition, and a method for constructing the structure. The polymeric concrete composition is formulated by integrating a rubber powder ground from waste tires or waste rubber and an aggregate using a polymeric binder, and if required, by adding a pigment and aromatic capsules capable of providing remedial and psychological effects. The polymeric concrete structure manufactured using such polymeric concrete composition has appropriate elasticity, water permeability, strength and a pleasant aroma. Thus, the polymeric concrete composition is useful for paving a footpath, a roadway, a bikeway, a railway crossing, a parking lot, a stadium, a racing track, a landing strip, etc., and as a material for civil engineering and constructions such as blocks, tile sound-absorbing plates, soundproofing plates, soundproofing walls and retaining walls.

22 Claims, No Drawings

ELASTIC WATER-PERMEABLE CONCRETE COMPOSITION, FORMULATION METHOD THEREFOR, ELASTIC WATER-PERMEABLE CONCRETE STRUCTURE FORMED OF THE COMPOSITION, AND METHOD FOR CONSTRUCTING THE STRUCTURE

BACKGROUND OF THE INVENTION

1. Field of the Invention

The present invention relates to an elastic water-permeable polymeric concrete composition, a preparation method therefor, an elastic water-permeable polymeric concrete structure and a method for constructing the structure, and more particularly, to an elastic water-permeable polymeric concrete composition, prepared by integrating rubber powder ground from waste tires or waste rubber and aggregate using a polymeric binder, and adding, if required, a pigment and aromatic capsules providing remedial and psychological effects, which is useful to pave a footpath, a roadway, a bikeway, a railway crossing, a parking lot, a stadium, a racing track, a landing strip, etc., and as a material for civil engineering and constructions such as blocks, tile sound-absorbing plates, soundproofing plates, soundproofing walls and retaining walls, a preparation method therefor, an elastic water-permeable polymeric concrete structure and a method for constructing the structure.

2. Description of the Related Art

In general, a water-permeable asphalt or cement concrete has been used as a material for paving a footpath and a bikeway. Such water-permeable concrete allows water to permeate into the ground via voids between aggregates, so that water can be supplied to street trees, which is helpful to grow the trees. The water-permeable concrete allows water to permeate into the base, thereby delaying inflow of water into urban rivers. As a result, the water-permeable concrete helps prevent overflowing of the rivers. Also, the water-permeable concrete prevents rain water from collecting on the surface of the roadway, thereby smoothing traffic flow. Due to the above merits, use of the water-permeable concrete has increased.

However, void fraction should be increased to improve the above merits of the water-permeable concrete, thereby decreasing the strength of the roadway paved with the water-permeable concrete. In particular, the roadway paved with the water-permeable concrete has a rough surface and less elasticity. Accordingly, such a roadway cannot give stability to a bicycle or a car. Also, the roadway can easily hurt a person fallen over on the road, and quickly fatigues a walker.

Thus, to improve such problems, a method for formulating concrete using a waste tire or waste rubber has been disclosed. For example, Korea Patent Laid-open Publication No. 93-23423 discloses a method for formulating concrete by adding a waste tire to asphalt concrete. Also, in Korea Patent Laid-open Publication No. 94-6738, a concrete is formulated by grinding waste tires or waste rubber, steaming the powder and molding the paste. According to a method disclosed in Korea Patent Laid-open Publication No. 95-2505, waste rubber is ground and dissolved in an organic solvent, and then the obtained waste rubber solution is mixed with gravel or sand and then molded. Also, Korea Patent Publication No. 90-426 discloses a method for formulating asphalt using natural rubber, synthetic rubber or waste rubber, asphalt and mixing agent.

However, even though the above-disclosed methods use waste tires or waste rubber, the concrete obtained by the above method shows poor water-permeability and has complex formulation thereof.

Also, a method which improves such problems, increases water-permeability and simplifies the overall formulation process by using only waste tire powder and an adhesive agent is disclosed in Japan Patent Publication No. Sho-54-33654. However, the water-permeable rubber concrete obtained by the method shows weak compression strength.

In addition, the odor of the concrete stimulates the sense of smell when paved onto the roadway. However, technology of formulating aromatic concrete capable of improving such a problem has not yet been disclosed.

Recently, waste rubber, particularly, waste tires, increases as a serious pollutant worldwide. As an aspect of reusing resources, research has been conducted into reuse of waste tire. However, few proper uses of waste tires have been found. Thus, a method is required for formulating an aromatic concrete having a high water-permeability and affinity to the environment.

SUMMARY OF THE INVENTION

To solve the above problems, it is a first objective of the present invention to provide an elastic water-permeable polymeric concrete composition formed of waste tires or waste rubber powder and an aggregate, which has appropriate elasticity and strength, and is aromatic as well as economical.

It is a second objective of the present invention to provide an elastic water-permeable concrete structure constructed of the elastic water-permeable polymeric concrete composition.

It is a third objective of the present invention to provide a method for formulating the elastic water-permeable polymeric concrete composition.

It is a fourth objective of the present invention to provide a method for constructing the elastic water-permeable polymeric concrete structure.

According to an aspect of the first objective, there is provided an elastic water-permeable polymeric concrete composition comprising: an aggregate of more than 70 wt %, such as gravel or broken stones, based on the total weight of the composition; a rubber powder of 4–24 wt % based on the total weight of the composition; a primer of 2–3 wt % based on the total weight of the composition, coating the rubber powder, and a polymeric binder of 4–22 wt % based on the total weight of the composition.

If the content of the aggregate is less than 70 wt %, binding capacity decreases. Also, if the content of the rubber powder is less than 4 wt %, elasticity of the structure manufactured using the composition decreases. On the contrary, if the content of the rubber powder exceeds 24 wt %, mechanical properties of the structure manufactured using the composition are deteriorated. Also, if the content of the primer coating the rubber powder is less than 2 wt %, binding capacity decreases. If the content of the primer exceeds 3 wt %, cost increases without further increase in binding capacity. In addition, if the content of the binder is less than 4 wt %, the strength of a polymeric concrete structure manufactured therefrom is inferior due to poor binding capacity. If the content of the binder exceeds 22 wt %, it is not helpful to further increase the binding capacity. Thus, there is no need to use excessive binder, which is more expensive than the aggregate or rubber powder.

Preferably, the elastic water-permeable polymeric concrete composition further comprises a pigment.

Preferably, the content of the pigment is 1–3 wt % based on the total weight of the composition. If the content of the pigment is less than 1 wt %, its color is not distinct. Also, if the content of the pigment exceeds 3 wt %, costs increases.

Preferably, the elastic water-permeable polymeric concrete composition may further comprises aromatic capsules.

Preferably, the content of the aromatic capsules is 1–3 wt % based on the total weight of the composition. If the content of the aromatic capsule is less than 1 wt %, aroma is poor. On the contrary, if the content of the aromatic capsule is over 3 wt %, spray coating of the aromatic capsule becomes difficult as well as costs increasing.

Preferably, the polymeric binder is at least one selected from the group consisting of epoxy resin, polyurethane resin, chloroprene resin, ethylene-vinylacetate resin, acryl resin, rubber latex and polyvinylalcohol resin.

Preferably, the surface of the aggregate is coated with a binder to improve binding capacity with the rubber powder.

According to another aspect of the first objective, there is provided an elastic water-permeable polymeric concrete composition comprising: a rubber powder of more than 80 wt % based on the total weight of the composition; a primer of 3–5 wt % based on the total weight of the composition, coating the rubber powder; and a polymeric binder of 7–14 wt % based on the total weight of the composition.

If the content of the rubber powder is less than 80 wt %, elasticity of the structure manufactured using the same decreases. Also, if the content of the primer coating the rubber powder is less than 3 wt %, binding capacity between the rubber powder decreases. On the other hand, if the content of the primer exceeds 5 wt %, only cost increases without further increase in the binding capacity between the rubber powder. Also, if the content of the binder is less than 7 wt %, binding capacity between the rubber powder decreases. Meanwhile, if the content of the binder is over 14 wt %, only cost increases without further increase in binding capacity between the rubber powder.

Preferably, the elastic water-permeable polymeric concrete composition further comprises a pigment.

Preferably, the content of the pigment is 1–3 wt % based on the total weight of the composition.

Preferably, the elastic water-permeable polymeric concrete composition further comprises aromatic capsules.

Preferably, the content of the aromatic capsules is 1–3 wt % based on the total weight of the composition.

Preferably, the polymeric binder is at least one selected from the group consisting of epoxy resin, polyurethane resin, chloroprene resin, ethylene-vinylacetate resin, acryl resin, rubber latex and polyvinylalcohol resin.

In the elastic water-permeable polymeric concrete compositions according to the first and second embodiments of the present invention, the largest dimension of the aggregate may be over 4–50 mm. Here, the largest dimension of the aggregate means the length of the aggregate along the cross-sectional direction of the largest dimension. If the largest dimension of the aggregate is less than 4 mm, binding capacity with the rubber powder is decreased. Also, if the dimension of the aggregate is over 50 mm, it is difficult to disperse the aggregate.

Preferably, in the elastic water-permeable polymeric concrete compositions according to the first and second embodiments of the present invention, the rubber powder may have a largest dimension of 0.2–40 mm. If the largest dimension of the rubber powder is less than 0.2 mm, dispersion of the composition is poor and costs increase. On the contrary, if the largest dimension of the rubber powder exceeds 40 mm, binding capacity of the structure manufactured using the composition decreases.

Preferably, in the elastic water-permeable polymeric concrete compositions according to the first and second embodiments of the present invention, the rubber powder is obtained from waste tires or waste rubber. Thus, the elastic water-permeable polymeric concrete composition according to the present invention is environment-friendly by recycling resources, and is cheaper.

To achieve the second objective of the present invention, there is provided an elastic water-permeable polymeric concrete structure constructed of the elastic water-permeable polymeric concrete composition according to the first or second embodiment of the present invention.

Preferably, in the elastic water-permeable polymeric concrete structure constructed of the elastic water-permeable polymeric concrete composition, containing the aromatic capsules, the aromatic capsules are coated on the surface of the concrete structure using the polymeric binder.

Preferably, the content of the aromatic capsules contained in the concrete structure is 1–3 wt % based on the total weight of the structure.

According to an aspect of the third objective, there is provided a method for formulating an elastic water-permeable polymeric concrete composition, comprising the steps of: (a) coating the surface of an aggregate, which has been cleaned and dried, with a polymeric binder; (b) coating a rubber powder with a primer; (c) formulating a first mixture by mixing the aggregate coated with the polymeric binder and the rubber powder coated with the primer; and (d) formulating a second mixture by mixing a pigment and more of the binder with the first mixture.

Preferably, the content of the aggregate is 70 wt %, the content of the rubber powder is 4–24 wt %, the content of the primer is 2–3 wt %, the content of the polymeric binder is 4–22 wt %, and the content of the pigment is 1–3 wt %, based on the total weight of the composition.

According to an aspect of the fourth objective, there is provided a method for constructing an elastic water-permeable polymeric concrete structure, comprising the steps of: manufacturing a elastic water-permeable polymeric concrete structure by paving the second mixture on the surface of a road; and coating the surface of the manufactured structure with a mixture of a aromatic capsules and a polymeric binder.

Preferably, the content of the aromatic capsules is 1–3 wt % based on the total weight of the structure.

According to another aspect of the third objective, there is provided a method for formulating an elastic water-permeable polymeric concrete composition, comprising the steps of: (a) coating a rubber powder with a primer; and (b) formulating a third mixture by mixing a pigment and a polymeric binder with the rubber powder coated with the primer.

Preferably, the content of the rubber powder is more than 80 wt %, the content of the primer is 3–5 wt %, the content of the polymeric binder is 7–14 wt %, and the content of the pigment is 1–3 wt %, based on the total weight of the composition.

According to another aspect of the fourth objective, there is provided a method for constructing an elastic water-permeable polymeric concrete structure, comprising the steps of: manufacturing an elastic water-permeable polymeric concrete structure by paving the third mixture on the surface of a road; and coating the surface of the manufactured structure with a mixture of aromatic capsules and a binder.

Preferably, the content of the aromatic capsules is 1–3 wt % based on the total weight of the structure.

DESCRIPTION OF THE PREFERRED EMBODIMENTS

An elastic water-permeable polymeric concrete structure such as a footpath, bikeway or roadway, constructed from an elastic water-permeable polymeric concrete composition according to the present invention, which contains rubber powder coated with primer, an aggregate and a binder, or rubber powder coated with primer and a polymeric binder, as basic elements, has appropriate elasticity, strength and water-permeability. On the surface of the footpath, bikeway or roadway constructed of the composition according to the present invention, rain water is not collected, thereby reducing the risk of accident. Also, such a structure is excellent in absorbing vibration, thereby reducing noise and providing cushioning to a passenger. Also, the elastic water-permeable polymeric concrete composition according to the present invention may contain aromatic capsules having forest aroma, e.g., phytoncide, fruit aroma such as lemon or orange, or flower aroma, which provides remedial and psychological effects. Thus, the structure such as footpath, bikeway and roadway, constructed from the composition containing the aroma capsule, refreshes a passenger.

Also, in the elastic water-permeable polymeric concrete composition according to the present invention, in general, the rubber powder is obtained from waste tires or other waste rubber. Thus, the composition and the structure constructed of the composition are environment-friendly and are economical because they are based on a waste resource.

Hereinafter, the present invention will be described in detail by explaining a method for formulating an elastic water-permeable composition and a method for constructing an electric water-permeable polymeric concrete structure using the composition.

A method for formulating an elastic water-permeable polymeric concrete composition according to a first embodiment of the present invention, and a method for constructing an elastic water-permeable polymeric concrete structure according to a first embodiment of the present invention will be described. The elastic water-permeable polymeric concrete structure according to the first embodiment of the present invention is constructed of the composition according to the first embodiment of the present invention.

First, aggregate of 70 wt % based on the total weight of the composition is cleaned with water and dried. In general, the aggregate, a major component of concrete, is gravel or broken stones. Preferably, the aggregate is particles having a largest dimension of 4–50 mm. If the largest dimension of the aggregate is less than 4 mm, the aggregate is too small, thereby deteriorating binding capacity with rubber powder. Also, if the dimension of the aggregate is over 50 mm, it is difficult to disperse the aggregate.

Then, in order to facilitate binding the rubber powder with the aggregate, the surface of the aggregate is coated with a polymeric binder using a ball mill. Here, amount of polymeric binder coated on the surface of the aggregate is adjusted to the minimum which allows the rubber powder to adhere to the surface of the aggregate. Here, the polymeric binder may be epoxy resin, polyurethane resin, chloroprene resin, ethylene-vinylacetate resin, acryl resin, rubber latex or polyvinyl alcohol resin. However, any kinds of binder capable of binding between aggregates, aggregate and rubber powder, or rubber powder may be used.

Subsequently, the surface of the rubber powder of 4–24 wt % based on the total weight of the composition is coated with a primer of 2–3 wt % based on the total weight of the composition. Coating the surface of the rubber powder with a primer improves adhesion between the rubber powder and the aggregate, and the rubber powder. However, the surface of the rubber powder may be not coated with a primer. Such primer may be an adhesive agent belonging to a urethane family, e.g., BOND ACE 007 (manufactured by DONG SUNG Chemical Co.) or an adhesive agent belonging to an acryl family, e.g., D-PLY 22H (manufactured by DONG SUNG Chemical Co.). Other than the above adhesive agents, any kinds of adhesive agent capable of increasing binding between rubber powder and aggregate, and between rubber powder may be used as the primer of the present invention.

In general, the rubber powder is ground from waste rubber, such as waste tires, and has a largest dimension within the range of 0.2–40 mm.

Then, the rubber powder is adhered to the surface of the aggregate by mixing the aggregate coated with the binder and the rubber powder coated with the primer. Here, in order to improve difficulty in uniform dispersion of the rubber powder in the aggregate, the aggregate coated with the binder and the rubber powder coated with the primer are mixed using a ball mill, thereby evenly dispersing the rubber powder in the aggregate.

A polymeric concrete structure constructed using the polymeric concrete composition according to the present invention in which the aggregate particles and the rubber powder are evenly mixed has a better elasticity, and deformation under external stress and heat is also decreased, compared with a concrete structure manufactured using a conventional concrete composition obtained by dissolving or steaming waste rubber.

After the aggregate to which the rubber powder is evenly adhered is transported to a construction site by using a container or a dump truck, preferably, the aggregate is mixed with an additive such as pigment and polymeric binder using a ball mill at the construction site, before being paved.

Here, the amount of polymeric binder to be added is adjusted to 4–22 wt % including the amount of binder coated on the surface of the aggregate, based on the total weight of the polymeric concrete composition. Also, the amount of pigment to be added is adjusted to 1–3 wt % based on the total weight of the polymeric concrete composition. The pigment is added in order to provide a color to the polymeric concrete. The pigment may be selected without restriction. However, preferably, an inorganic pigment having heat-resistance and durability is used.

An elastic water-permeable polymeric concrete structure is manufactured by paving the above polymeric concrete composition onto the surface of a road. Then, the surface of the polymeric concrete structure is hardened by a vibratory road roller, thereby increasing adhesion between the aggregates and planarizing the surface of the structure, resulting in a polymeric concrete structure.

Also, according to the present invention, an aromatic elastic water-permeable polymeric concrete structure may be manufactured by adding aromatic capsules to the polymeric concrete structure.

That is, after the elastic water-permeable polymeric concrete structure paved on the road is left for 2–5 days for hardening, wherein the hardening time depends on the thickness of the polymeric concrete structure, aromatic capsules mixture obtained by mixing aromatic capsules with a resin such as polymeric binder is coated on the surface of the concrete structure to a thickness of 1–2 mm.

The reason why the aromatic capsules are coated after being mixed with a resin is to improve aroma-holding capacity. Here, any kinds of resin capable of providing this effect may be used without restriction.

Preferably, the content of aromatic capsules is 1–3 wt % based on the total weight of the polymeric concrete structure. Here, the aromatic capsules of less than 1 wt % based on the total weight of the polymeric concrete structure are not enough to provide an aroma. If the content of aromatic capsules exceeds 3 wt % based on the total weight of the polymeric concrete structure, it is difficult to spray the aromatic capsules onto the polymeric concrete structure and costs increase.

The aromatic capsule may contain forest aroma, e.g., phytoncide, fruit aroma such as lemon or orange, or flower aroma, providing remedial and psychological effects. For example, musk oil, pine tree oil or rose oil may be used.

Hereinafter, a method for formulating an elastic water-permeable polymeric concrete composition according to a second embodiment of the present invention, and a method for constructing an elastic water-permeable polymeric concrete structure according to a second embodiment of the present invention, will be described. Here, the elastic water-permeable polymeric concrete structure according to the second embodiment is manufactured using the composition according to the second embodiment.

In the polymeric concrete composition and the polymeric concrete structure according to the second embodiment, a rubber powder and a polymeric binder are used as the basic elements, without using aggregate. Formulation of the polymeric concrete composition and construction of the polymeric concrete structure according to the second embodiment are the same in those according to the first embodiment, except that the aggregate is not used. Thus, explanation thereof will be brief.

First, the surface of the rubber powder of 80 wt % based on the total weight of the composition is coated with a primer of 3–5 wt % based on the total weight of the composition. However, the surface of the rubber powder may be not coated with the primer. Such primer may be the above-mentioned adhesive agents. In general, the rubber powder is ground from waste rubber, such as waste tires, and has a largest dimension within the range of 0.2–40 mm.

After the rubber powder coated with the primer is transported to a construction site by using a container or a dump truck, preferably, the rubber powder is mixed with an additive such as pigment and polymeric binder using a ball mill at the construction site before being paved.

Here, the amount of polymeric binder to be added is adjusted to 7–14 wt % based on the total weight of the polymeric concrete composition. Also, the amount of pigment to be added is adjusted to 1–3 wt % based on the total weight of the polymeric concrete composition.

An elastic water-permeable polymeric concrete structure is manufactured by paving the above polymeric concrete composition on the surface of a road. Then, the surface of the polymeric concrete structure is hardened by a vibratory road roller, thereby increasing adhesion between rubber powder and planarizing the surface of the structure, resulting in a polymeric concrete structure.

Also, according to the present invention, an aromatic elastic water-permeable polymeric concrete structure may be manufactured by adding aromatic capsules to the polymeric concrete structure containing no aggregate according to the second embodiment.

That is, after the elastic water-permeable polymeric concrete structure paved on the road is left for complete hardening, aromatic capsules mixture obtained by mixing the aromatic capsules of 1–3 wt % based on the total weight of the polymeric concrete structure with a resin such as polymeric binder is coated on the surface of the polymeric concrete structure to a thickness of 1–2 mm.

In the elastic water-permeable polymeric concrete structures according to the first and second embodiments of the present invention, constructed by the above methods, a specific gravity was 0.48–1.89, a void fraction was 12–59 wt %, a water-permeability coefficient was 0.5–4.5 cm/sec, and a compression strength was 70–350 kg/m$^2$.

In the elastic water-permeable polymeric concrete composition and the concrete structure manufactured using the composition according to the present invention, the content of each element may vary depending on use. Thus, the content of each element described above should be understood as a level to give the optimal physical properties for paving a footpath, a bikeway or a roadway.

Hereinafter, the present invention will be described in detail through examples. However, the present invention is not limited to the following examples.

EXAMPLE 1

Broken stones of 70 kg, having a largest dimension of 5–50 mm, were cleaned in water and dried. Then, a slight hardening agent as well as an epoxy resin of 4 kg as a polymeric binder were mixed with the cleaned broken stones using a ball mill, thereby coating the surfaces of the broken stones with the polymeric binder.

The broken stones coated with the polymeric binder and rubber powder (having a largest dimension of 0.1–30 mm) of 10 kg coated with a primer of 2 kg (BOND ACE 007, produced by DONG SUNG Chemical Co.), obtained from waste tires, were mixed using a ball mill, resulting in a mixture in which the rubber powder was evenly distributed onto the surfaces of the broken stones.

Then, chromium oxide of 2 kg as a green pigment and polyurethane resin of 8 kg as a polymeric binder were added to the mixture and mixed using a ball mill. Such obtained polymeric concrete composition was put in a cylindrical mold (diameter of 10 cm×height of 20 cm) for measuring compression strength, and a flat mold (30 cm×30 cm×7 cm) for measuring water-permeability coefficient, and pressure corresponding to a weight of 3 tons was applied thereto for 1 minute. Then, while a lid of the mold was open, the polymeric concrete composition contained in the molds was hardened for 5 days, thereby producing the polymeric concrete structures. After removing the samples from the molds, various physical properties were measured. The results are tabulated in Table 1.

EXAMPLE 2

An elastic water-permeable polymeric concrete structure was manufactured by the same method as in Example 1. Then, a liquid mixture containing polyurethane resin of 15 kg and aromatic capsules of 2 kg each based on the total weight of the polymeric concrete structure was spray-coated on the surface of the polymeric concrete structure to a thickness of 1 mm, and then left for 2 days for drying. Then, various physical properties of the aromatic polymeric concrete structure were measured. The results are tabulated in Table 2.

TABLE 1

| largest dimension of broken stone (mm) | largest dimension of rubber powder (mm) | specific gravity | void fraction[1] (%) | compression strength[2] (kg/cm$^2$) | water-permeability coefficient[3] (cm/sec) |
|---|---|---|---|---|---|
| 5  | 0.1 | 1.87 | 12 | 348 | 0.5 |
|    | 1   | 1.48 | 16 | 312 | 0.9 |
|    | 2   | 1.41 | 17 | 267 | 1.2 |
|    | 10  | 1.16 | 20 | 153 | 1.6 |
|    | 30  | 0.86 | 22 | 81  | 1.8 |
| 10 | 0.1 | 1.62 | 16 | 350 | 0.7 |
|    | 1   | 1.36 | 23 | 345 | 1.1 |
|    | 2   | 1.31 | 24 | 310 | 1.2 |
|    | 10  | 1.28 | 25 | 247 | 1.5 |
|    | 30  | 1.21 | 26 | 162 | 2.1 |
| 20 | 0.1 | 1.43 | 22 | 285 | 1.2 |
|    | 1   | 1.27 | 29 | 221 | 1.8 |
|    | 2   | 1.06 | 32 | 174 | 2.2 |
|    | 10  | 0.92 | 35 | 132 | 2.7 |
|    | 30  | 0.74 | 37 | 116 | 3.6 |
| 50 | 0.1 | 1.61 | 36 | 176 | 3.5 |
|    | 1   | 1.43 | 40 | 148 | 3.6 |
|    | 2   | 1.24 | 42 | 121 | 3.7 |
|    | 10  | 0.95 | 48 | 96  | 3.8 |
|    | 30  | 0.48 | 59 | 70  | 4.5 |

[1] The void fraction was calculated by 100(1-d/D), wherein d is an actual density and D is a density under the assumption that there are no voids.
[2] The compression strength was measured by the compression strength test method (KSF2406).
[3] The water-permeability coefficient is obtained by a constant-level permeability parameter measurement.

TABLE 2

| largest dimension of broken stone (mm) | largest dimension of rubber powder (mm) | specific gravity | void fraction[1] (%) | compression strength[2] (kg/cm$^2$) | water-permeability coefficient[3] (cm/sec) |
|---|---|---|---|---|---|
| 5  | 0.1 | 1.89 | 8  | 350 | 0.5 |
|    | 1   | 1.51 | 12 | 322 | 0.7 |
|    | 2   | 1.46 | 15 | 285 | 0.8 |
|    | 10  | 1.20 | 18 | 171 | 1.0 |
|    | 30  | 0.98 | 20 | 100 | 1.2 |
| 10 | 0.1 | 1.68 | 13 | 350 | 0.5 |
|    | 1   | 1.52 | 20 | 347 | 0.8 |
|    | 2   | 1.43 | 21 | 320 | 0.9 |
|    | 10  | 1.36 | 22 | 251 | 1.1 |
|    | 30  | 1.31 | 23 | 178 | 1.4 |
| 20 | 0.1 | 1.47 | 20 | 312 | 1.0 |
|    | 1   | 1.35 | 24 | 256 | 1.4 |
|    | 2   | 1.12 | 28 | 186 | 2.2 |
|    | 10  | 1.01 | 30 | 152 | 1.9 |
|    | 30  | 0.78 | 32 | 131 | 2.1 |
| 50 | 0.1 | 1.71 | 32 | 194 | 2.2 |
|    | 1   | 1.52 | 33 | 173 | 2.3 |
|    | 2   | 1.33 | 35 | 142 | 2.4 |
|    | 10  | 1.06 | 34 | 117 | 2.6 |
|    | 30  | 0.64 | 34 | 120 | 2.8 |

EXAMPLE 3

An elastic water-permeable polymeric concrete structure was manufactured by the same method as in Example 1, using a polymeric concrete composition containing rubber 80 kg, chromium oxide of 2 kg and polyurethane resin of 18 kg, without broken stone. Then, various physical properties of the elastic water-permeable polymeric concrete structure were measured. The results are tabulated in Table 3.

TABLE 3

| largest dimension of rubber powder (mm) | specific gravity | void fraction (%) | compression strength (kg/cm$^2$) | water-permeability coefficient (cm/sec) |
|---|---|---|---|---|
| 0.1 | 1.58 | 14 | 92 | 0.7 |
| 1   | 1.35 | 19 | 84 | 1.0 |
| 2   | 1.22 | 20 | 82 | 1.4 |

TABLE 3-continued

| largest dimension of rubber powder (mm) | specific gravity | void fraction (%) | compression strength (kg/cm²) | water-permeability coefficient (cm/sec) |
|---|---|---|---|---|
| 10 | 0.73 | 22 | 78 | 2.7 |
| 30 | 0.48 | 41 | 70 | 4.4 |

EXAMPLE 4

An aromatic elastic water-permeable polymeric concrete structure was manufactured by the same method as in Example 2, using a polymeric concrete composition containing rubber powder of 80 kg, chromium oxide of 2 kg, polyurethane resin of 16 kg and aromatic capsules of 2 kg without broken stones. Then, various physical properties of the aromatic polymeric concrete structure were measured. The results are tabulated in Table 4.

TABLE 4

| largest dimension of rubber powder (mm) | specific gravity | void fraction (%) | compression strength (kg/cm²) | water-permeability coefficient (cm/sec) |
|---|---|---|---|---|
| 0.1 | 1.62 | 13 | 96 | 0.6 |
| 1 | 1.41 | 17 | 87 | 0.9 |
| 2 | 1.33 | 19 | 85 | 1.2 |
| 10 | 0.92 | 20 | 81 | 2.2 |
| 30 | 0.51 | 37 | 72 | 3.8 |

Comparative Example 1

A composition was obtained by mixing a rubber solution (in which rubber powder of 50 wt % was dissolved in chloromethane) of 40 kg, sulfur of 20 kg and broken stones of 40 kg. The composition was poured into a mold which was the same as that used in Example 1, and then hardened at 165° C. under a weight of 5 tons for 30 minutes. After removing the hardened samples from the molds, various physical properties of the samples were measured. The results are tabulated in Table 5.

TABLE 5

| largest dimension of broken stone (mm) | largest dimension of rubber powder (mm) | specific gravity | void fraction (%) | compression strength[2] (kg/cm²) | water-permeability coefficient[3] (cm/sec) |
|---|---|---|---|---|---|
| 5 | 0.1 | 2.16 | 0 | 1,126 | 0 |
| | 1 | 2.08 | 0 | 1,181 | 0 |
| | 2 | 2.02 | 0 | 1,053 | 0 |
| | 10 | 1.94 | 0 | 872 | 0 |
| | 30 | 1.76 | 0 | 634 | 0 |
| 10 | 0.1 | 2.04 | 0 | 1,240 | 0 |
| | 1 | 1.92 | 0 | 1,162 | 0 |
| | 2 | 1.92 | 0 | 1,054 | 0 |
| | 10 | 1.86 | 0 | 963 | 0 |
| | 30 | 1.73 | 0 | 858 | 0 |
| 20 | 0.1 | 1.82 | 0 | 1,186 | 0 |
| | 1 | 1.81 | 0 | 1,091 | 0 |
| | 2 | 1.80 | 0 | 983 | 0 |
| | 10 | 0.77 | 0 | 815 | 0 |
| | 30 | 0.62 | 0 | 722 | 0 |
| 50 | 0.1 | 1.65 | 0 | 826 | 0 |
| | 1 | 1.53 | 0 | 814 | 0 |
| | 2 | 1.51 | 0 | 763 | 0 |
| | 10 | 1.48 | 0 | 645 | 0 |
| | 30 | 1.42 | 0 | 560 | 0 |

Comparative Example 2

An asphalt concrete structure was constructed using rubber powder of 20 kg and asphalt of 80 kg, without broken stones, by the same method as in Example 1. Then, various physical properties of the asphalt concrete structure were measured. The results are tabulated in Table 6.

TABLE 6

| largest dimension of rubber powder (mm) | specific gravity | void fraction (%) | compression strength (kg/cm²) | water-permeability coefficient (cm/sec) |
|---|---|---|---|---|
| 0.1 | 1.94 | 1 | 32 | 0.1 |
| 1 | 1.93 | 1 | 30 | 0.1 |
| 2 | 1.88 | 1 | 28 | 0.1 |
| 10 | 0.64 | 2 | 18 | 0.2 |
| 30 | 0.31 | 4 | 14 | 0.3 |

Comparative Example 3

A composition was obtained by mixing rubber powder of 30 kg, pre-treated with tar oil, sulfur of 20 kg, and broken stones of 50 kg. The composition was poured into a mold, and then hardened at 165° C. under a weight of 5 tons for 30 minutes. After removing the hardened samples from the molds, various physical properties of the sample were measured. The results are tabulated in Table 7.

The polymeric concrete structures manufactured by Examples 1 through 4, belonging to the present invention, have less compression strength than those of Comparative Examples 1 and 2. However, there is no problem in using the polymeric concrete structures according to the present invention for a footpath or a bikeway. Also, while the void fractions of the concrete structures of Comparative Examples are both zero, which means that the concrete structures of Comparative Examples do not allow water to permeate, the polymeric concrete structures of Examples 1 through 4 have excellent water permeability.

As above, the elastic water-permeable polymeric concrete structures for a footpath, a bikeway and a roadway according to the present invention, constructed by the elastic water-permeable polymeric concrete composition containing rubber powder coated with a primer, aggregate and a polymeric binder, or rubber powder coated with a primer and a polymeric binder, as basic elements, have appropriate elasticity, strength and water permeability.

TABLE 7

| largest dimension of broken stone (mm) | largest dimension of rubber powder (mm) | specific gravity | void fraction (%) | compression strength[2] (kg/cm$^2$) | water-permeability coefficient[3] (cm/sec) |
|---|---|---|---|---|---|
| 5 | 0.1 | 1.98 | 0 | 752 | 0 |
|   | 1 | 1.87 | 0 | 732 | 0 |
|   | 2 | 1.85 | 0 | 728 | 0 |
|   | 10 | 1.73 | 0 | 660 | 0 |
|   | 30 | 1.42 | 0 | 561 | 0 |
| 10 | 0.1 | 1.96 | 0 | 770 | 0 |
|   | 1 | 1.95 | 0 | 758 | 0 |
|   | 2 | 1.87 | 0 | 742 | 0 |
|   | 10 | 1.75 | 0 | 636 | 0 |
|   | 30 | 1.48 | 0 | 538 | 0 |
| 20 | 0.1 | 1.78 | 0 | 736 | 0 |
|   | 1 | 1.67 | 0 | 720 | 0 |
|   | 2 | 1.59 | 0 | 715 | 0 |
|   | 10 | 1.55 | 0 | 626 | 0 |
|   | 30 | 1.52 | 0 | 471 | 0 |
| 50 | 0.1 | 1.56 | 0 | 538 | 0 |
|   | 1 | 1.47 | 0 | 521 | 0 |
|   | 2 | 1.44 | 0 | 516 | 0 |
|   | 10 | 1.38 | 0 | 412 | 0 |
|   | 30 | 1.35 | 0 | 320 | 0 |

Thus, the footpath, bikeway and roadway constructed of the composition according to the present invention do not collect rain water on their surface, thereby reducing the risk of accident.

Also, such structures of the present invention can reduce noise due to their vibration absorbing capacity, and provide cushioning to a passenger. Also, the elastic water-permeable polymeric concrete composition according to the present invention may contain aroma capsules having various aromas such as forest aroma, fruit aroma or flower aroma, which provide remedial and psychological effects.

Thus, the footpath, bikeway and roadway constructed of the composition containing such aroma capsules refresh a passenger.

Also, in the elastic water-permeable polymeric concrete composition according to the present invention, the rubber powder is generally obtained from waste tires or other waste rubber. Because the composition of the present invention and the structure manufactured of the composition according to the present invention are obtained from a waste resource, the composition and the structure of the present invention are economical as well as environment-friendly.

Also, the composition of the present invention may be used for concrete structures such as footpaths, roadways, bikeways, railway crossings, parking lots, stadiums, racing tracks, landing strips, blocks, tile sound-absorbing plates, soundproofing plates, soundproofing walls and retaining walls.

What is claimed is:

1. An elastic water-permeable polymeric concrete composition comprising:

an aggregate of more than 70 wt % based on the total weight of the composition;

a rubber powder of 4–24 wt % based on the total weight of the composition;

a primer of 2–3 wt % based on the total weight of the composition, coating the rubber powder, and a polymeric binder of 4–22 wt % based on the total weight of the composition.

2. The elastic water-permeable polymeric concrete composition of claim 1, further comprising a pigment.

3. The elastic water-permeable polymeric concrete composition of claim 2, wherein the content of the pigment is 1–3 wt % based on the total weight of the composition.

4. The elastic water-permeable polymeric concrete composition of any of claim 1, wherein the rubber powder is obtained from waste tires or waste rubber.

5. The elastic water-permeable polymeric concrete composition of any of claim 1, wherein the rubber powder has a largest dimension of 0.2–40 mm.

6. The elastic water-permeable polymeric concrete composition of any of claim 1, wherein the binder is at least one selected from the group consisting of epoxy resin, polyurethane resin, chloroprene resin, ethylene-vinylacetate resin, acryl resin, rubber latex and polyvinylalcohol resin.

7. The elastic water-permeable polymeric concrete composition of any of claim 1, wherein the surface of the aggregate is coated with the binder.

8. An elastic water-permeable polymeric concrete composition comprising:

a rubber powder of more than 80 wt % based on the total weight of the composition;

a primer of 3–5 wt % based on the total weight of the composition, coating the rubber powder; and a polymeric binder of 7–14 wt % based on the total weight of the composition.

9. The elastic water-permeable polymeric concrete composition of claim 8, further comprising a pigment.

10. The elastic water-permeable polymeric concrete composition of claim 9, wherein the content of the pigment is 1–3 wt % based on the total weight of the composition.

11. The elastic water-permeable polymeric concrete composition of any of claim 8, wherein the rubber powder is obtained from waste tires or waste rubber.

12. The elastic water-permeable polymeric concrete composition of any of claim 8, wherein the rubber powder has a largest dimension of 0.2–40 mm.

13. The elastic water-permeable polymeric concrete composition of any of claim 8, wherein the polymeric binder is at least one selected from the group consisting of epoxy resin, polyurethane resin, chloroprene resin, ethylene-vinylacetate resin, acryl resin, rubber latex and polyvinylalcohol resin.

14. An elastic water-permeable polymeric concrete structure constructed of the elastic water-permeable polymeric concrete composition claimed in claim 1.

15. A method for formulating an elastic water-permeable polymeric concrete composition, comprising the steps of:
  (a) coating the surface of an aggregate, which has been cleaned and dried, with a polymeric binder;
  (b) coating a rubber powder with a primer;
  (c) formulating a first mixture by mixing the aggregate coated with the polymeric binder and the rubber powder coated with the primer; and
  (d) formulating a second mixture by mixing a pigment and more of the polymeric binder with the first mixture.

16. The method of claim 15, wherein the content of the aggregate is 70 wt %, the content of the rubber powder is 4–24 wt %, the content of the primer is 2–3 wt %, the content of the polymeric binder is 4–22 wt %, and the content of the pigment is 1–3 wt %, based on the total weight of the composition.

17. A method for constructing an elastic water-permeable polymeric concrete structure, comprising the steps of:
  manufacturing a elastic water-permeable polymeric concrete structure by paving the second mixture of claim 15 on the surface of a road; and
  coating the surface of the manufactured structure with a mixture of aromatic capsules and a polymeric binder.

18. The method of claim 17, wherein the content of the aromatic capsules is 1–3 wt % based on the total weight of the structure.

19. A method for formulating an elastic water-permeable polymeric concrete composition, comprising the steps of:
  (a) coating a rubber powder with a primer; and
  (b) formulating a composition by mixing a pigment and a polymeric binder with the rubber powder coated with the primer.

20. The method of claim 19, wherein the content of the rubber powder is more than 80 wt %, the content of the primer is 3–5 wt %, the content of the polymeric binder is 7–14 wt %, and the content of the pigment is 1–3 wt %, based on the total weight of the composition.

21. A method for constructing an elastic water-permeable polymeric concrete structure, comprising the steps of:
  manufacturing an elastic water-permeable polymeric concrete structure by paving the mixture of claim 19 on the surface of a road; and
  coating the surface of the manufactured structure with a mixture of aromatic capsules and a polymeric binder.

22. The method of claim 21, wherein the content of the aromatic capsules is 1–3 wt % based on the total weight of the structure.

* * * * *